United States Patent
Ertl et al.

(10) Patent No.: US 7,457,437 B2
(45) Date of Patent: Nov. 25, 2008

(54) METHOD AND DEVICE FOR OPTICALLY DETECTING THE OPEN STATE OF A VEHICLE DOOR

(75) Inventors: Ludwig Ertl, Regensburg (DE);
Thorsten Köhler, Deuerling (DE);
Reinhard Rösl, Bernhardswald (DE);
Dirk Zittlau, Stöckelsberg (DE)

(73) Assignee: Siemens Aktiengesellschaft, Munich (DE)

( * ) Notice: Subject to any disclaimer, the term of this patent is extended or adjusted under 35 U.S.C. 154(b) by 1057 days.

(21) Appl. No.: 10/483,224

(22) PCT Filed: Jul. 3, 2002

(86) PCT No.: PCT/DE02/02423

§ 371 (c)(1),
(2), (4) Date: Jan. 9, 2004

(87) PCT Pub. No.: WO03/006278

PCT Pub. Date: Jan. 23, 2003

(65) Prior Publication Data

US 2005/0074142 A1    Apr. 7, 2005

(30) Foreign Application Priority Data

Jul. 10, 2001    (DE) ............................ 101 33 511

(51) Int. Cl.
*G06K 9/00*    (2006.01)

(52) U.S. Cl. ............... 382/104; 382/103; 382/100; 382/154

(58) Field of Classification Search ............. 382/100, 382/103, 104, 154
See application file for complete search history.

(56) References Cited

U.S. PATENT DOCUMENTS

| | | | |
|---|---|---|---|
| 5,835,613 A | 11/1998 | Breed et al. | |
| 6,324,453 B1 * | 11/2001 | Breed et al. | ................. 701/45 |
| 6,339,375 B1 * | 1/2002 | Hirata et al. | ............... 340/541 |
| 6,474,683 B1 * | 11/2002 | Breed et al. | ............... 280/735 |

FOREIGN PATENT DOCUMENTS

| | | |
|---|---|---|
| DE | 19736584 A1 | 2/1999 |
| DE | 10063697 A1 | 7/2002 |
| JP | 57-166921 | 10/1982 |
| JP | 8-177263 | 7/1996 |
| JP | 10-79019 | 3/1998 |
| JP | 2000-76452 | 3/2000 |
| WO | WO 00/65538 | 11/2000 |

* cited by examiner

*Primary Examiner*—Matthew C. Bella
*Assistant Examiner*—Wesley Tucker
(74) *Attorney, Agent, or Firm*—Laurence A. Greenberg; Werner H. Stemer; Ralph E. Locher

(57) ABSTRACT

The invention relates to a method for detecting the position of an object within the interior or a vehicle equipped with a door (4). The inventive method is characterized by recording a sequence of images by means of a camera (2) and calculating the actual position of the object by electronically evaluating the images of the sequence of images, and generating a differential image by comparing an actual recorded image with a previously stored image. The position of the object is calculated on the basis of the differential image. To achieve this, the camera (2) records images of the door (4). The images of the door (4) are evaluated and the open state of the door (4) is established on the basis of the differential image between the closed state and the opened state.

23 Claims, 5 Drawing Sheets

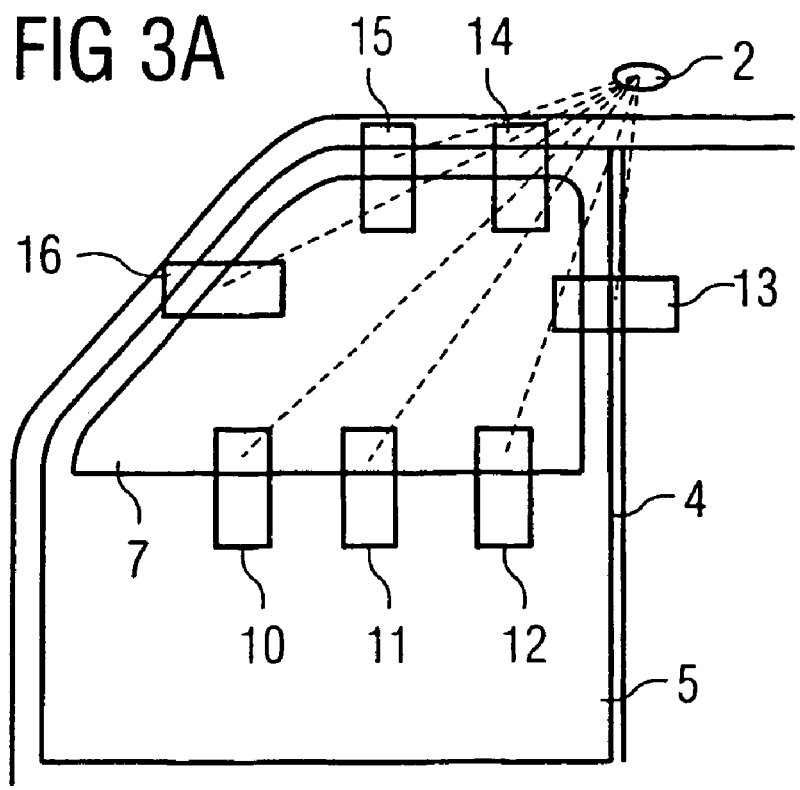
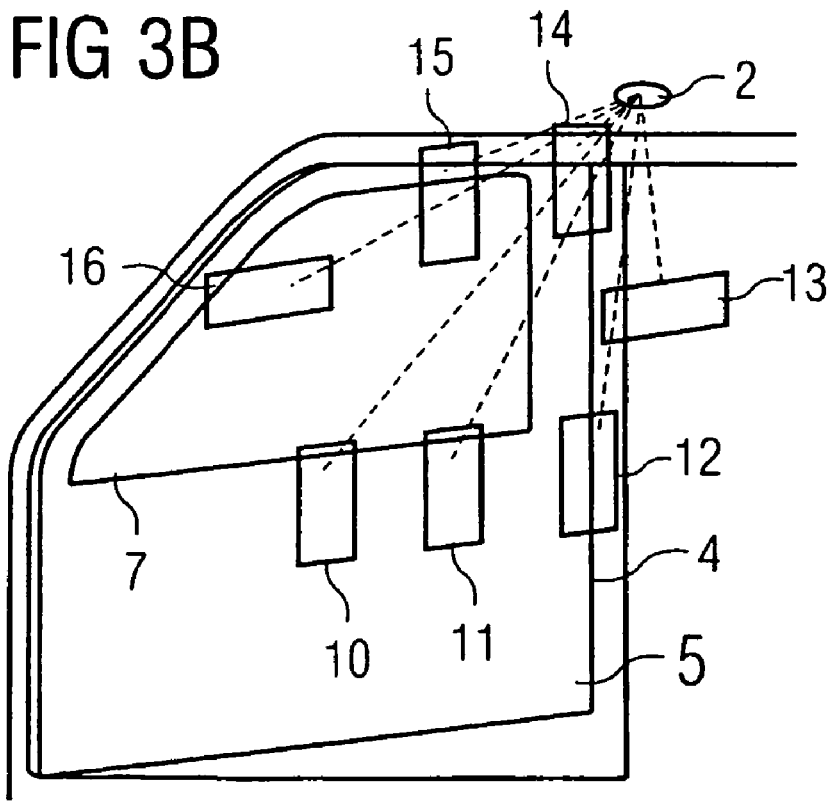

METHOD AND DEVICE FOR OPTICALLY DETECTING THE OPEN STATE OF A VEHICLE DOOR

CLAIM FOR PRIORITY

This application claims priority to PCT/DE02/02423, published in the German language on Jul. 3, 2002, which claims the benefit of priority to German application no. 10133511.3, filed in the German language on Jul. 10, 2001.

TECHNICAL FIELD OF THE INVENTION

The invention relates to a device and method for detecting the position of an object within the interior of a vehicle equipped with a door.

BACKGROUND OF THE INVENTION

WO 00 65538 discloses a differential image generated in which the contour of the object whose position is to be detected appears only if the object moves. In this method, only moving objects are automatically recorded in a scene, which makes it possible for images to be evaluated simply and reliably. A CCD or CMOS camera which is equipped with a wide-angle lens and mounted as high as possible within the interior of the vehicle, preferably in the roof lining of the vehicle, is used for recording images.

The camera or a different optical sensor system can be arranged between the front seats; with its viewing angle it then covers the area between the dashboard and the seat backrest and between the roof lining and the seat cushion.

The known method is used in order reliably to determine information about the position of the front passenger, in particular about the position of the front passenger's head, within the interior of the vehicle, and to use this information for releasing an airbag system.

On the other hand, it is also known for a door contact of the vehicle to be read out in order for this information to be evaluated for monitoring the airbag system. A monitoring device classifies the occupancy of a vehicle seat, in particular of the passenger seat, into various possible occupancy classes (empty seat; child-seat facing backwards; child-seat facing forwards; adult person) and permits, by means of defined transitional probabilities, transitions between these occupancy classes. Provided that the vehicle door is open, the airbag system should not, however, be enabled. For that reason, a door contact, for example a mechanical door contact, of the vehicle generates a signal which is fed to the monitoring system. To achieve this, an electric line exists from the door contact to the camera or sensor system in the roof lining.

A cable has, however, the disadvantage that laying it entails a cost. A long cable brings with it additional EMC problems (EMC=electromotive compatibility). The usually cheap door contact of the vehicle becomes a safety-relevant part because it affects the releasing of the airbag.

SUMMARY OF THE INVENTION

The invention relates to a method for detecting the position of an object within the interior of a vehicle equipped with a door, in which method a sequence of images is recorded by means of a camera and the actual position of the object is calculated by electronically evaluating the images of the sequence of images, a differential image being generated by comparing an actually recorded image with a previously stored image and the position of the object being calculated on the basis of the differential image.

The invention is establishes a method for reliably detecting the vehicle door.

According to one embodiment of the invention, a camera records images of the door, such that the images of the door are evaluated and in that, on the basis of the differential image between the closed state and the opened state, the open state of the door is established.

In addition to ascertaining the open state, the method can in particular also be used for establishing from the differential image the specific opening angle of the door. This opening angle can be used in order to prevent, when the vehicle is parked in a car park, the vehicle door from being opened too widely, as a result of which these or the vehicle body parts of an adjacent vehicle or other adjacent objects could be damaged.

The method for establishing a differential image is used in an advantageous manner in conjunction with a monitoring system. In this method, the camera generates, depending on the open state detected, a signal and feeds this signal to a monitoring system which, on the basis of the signal, switches on or off a security device for the protection of vehicle occupants. By this means, the disadvantages of a door contact connected with an electric line can be avoided.

Additionally or alternatively, the method according to the invention can be used in order to measure the open state of a window. In this case, the camera generates, depending on the detected open state of a window, a signal and feeds this signal to a monitoring system. This can prevent the arm or head of a passenger who is leaning out of the window from being jammed or injured by a motorized window actuator or an object from being jammed or damaged by the rising window. A precondition for this, however, is that the endangered body parts of the passenger or the object are not concealed, for example by the torso of the passenger.

When the camera detects an object within the range of the opened window, said camera supplies a signal to the monitoring system, based on which signal the monitoring system initializes a lockout which prevents the opened window from being closed.

The evaluation of gray-scale images proves to be a particularly suitable method for evaluating open states of the vehicle door or of a window.

In order, by means of a small number of gray-scale images, to reach a decision about the open state of the door and/or of a window, virtual image areas are defined for obtaining gray-scale images, in which virtual image areas changes in the gray-scale values are expected if there is a change in the open state of the door and/or window.

In order, when evaluating gray-scale images, to have to use as little storage space as possible in a data memory, for each image obtained a gray-scale curve is differentiated as a function of the location according to the location. The result of the differentiation is stored in each case and the open state determined from comparison of the stored data.

As an alternative to obtaining gray-scale images, three-dimensional distance images are recorded with a 3D camera, in order to establish from these the open state of the door and/or window. Measuring panels whose mean distance to the camera is measured are used here. In a further method, distance points are projected, after transformation into the vehicle system, onto a plane parallel to the floor of the vehicle. The projected images are then each stored and the open state determined from comparison of the stored data. Characteristic point clouds are determined by this means. When the door is opened, the position of the associated point cloud changes.

The present invention also relates to a device for implementing a method as described above.

BRIEF DESCRIPTION OF THE DRAWINGS

Embodiments of the invention are described in detail below with reference to the drawings, in which:

FIGS. 3a, b show a plan view of the passenger door from inside with edge boxes in a closed and in an opened state.

DETAILED DESCRIPTION OF THE INVENTION

Figure 1:
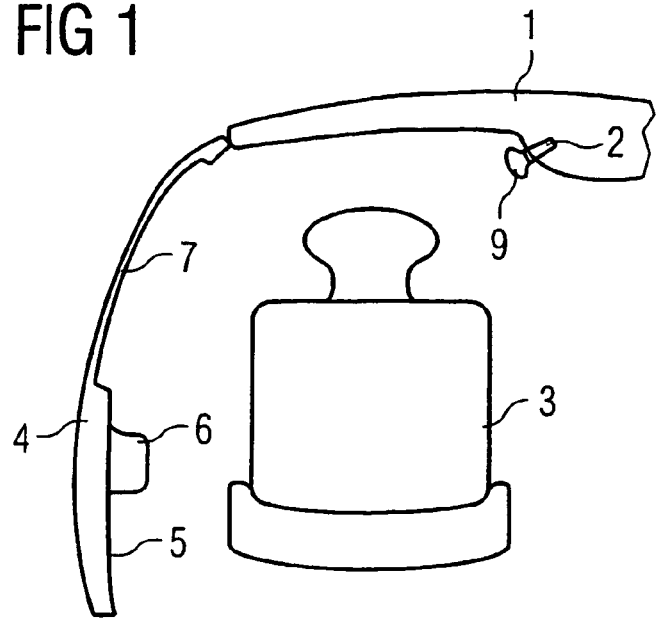
FIG. 1 shows a section through a vehicle at right angles to the direction of travel with a plan view of the passenger seat.
Figure 2A:
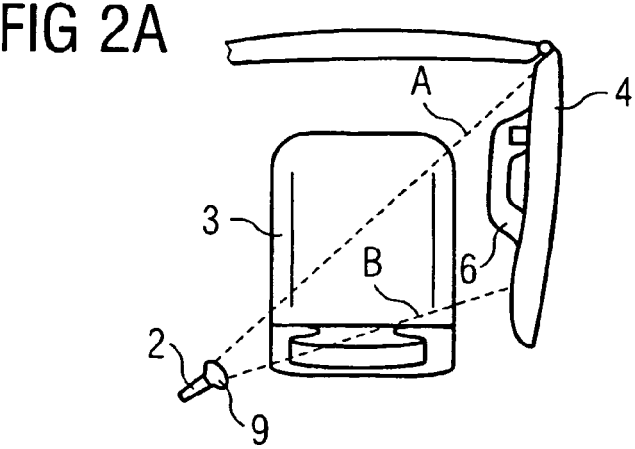
FIGS. 2a, b show a section coplanar with the vehicle floor with a plan view of the passenger seat when the door is closed and open.
Figure 2B:
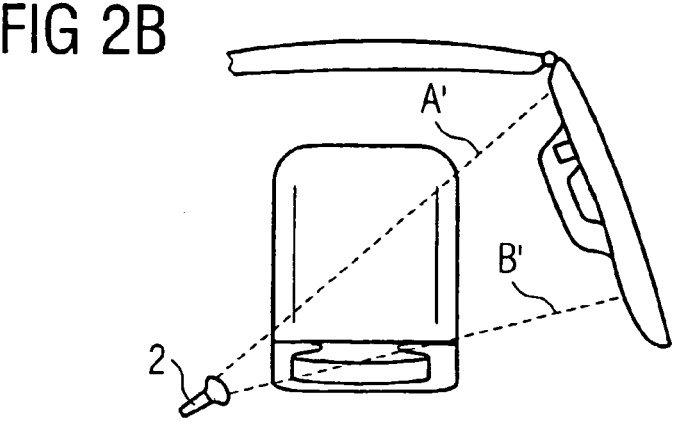

A CCD or CMOS camera 2 which is equipped with a wide-angle lens 9 is mounted in a vehicle with a roof lining 1 (FIGS. 1; 2a, b). The camera 2 is preferably aligned in the center of the vehicle or alternatively in the area of the upper steering spar of the vehicle body such that the image area of the camera above a seat 3 covers a door 4 both in the area of the inside of the door 5 with a door handle 6 and a window 7. A line A denotes the distance between the camera 2 and the door 4 in a closed state at a first point and a line B the distance at a second point. The lines A, B correspond to the lines A', B' in an open state.

When gray-scale images are recorded with the camera 2, edge boxes 10 to 16 (FIGS. 3a, b) are placed around the frame of the window 7. The edge boxes 10 to 16 are virtual image areas which are placed on prominent points of the door 4 having large changes in gray-scale values.

The edge box 10 which covers the lower area of the window 7 and an area of the inside 5 of the door is M pixels long in the y-direction, i.e. in the working direction of the camera 2 and N pixels wide in the x-direction. Inside the edge box, the coloration of a door seal 8, which is black, can also be detected as well as the gray-scale values for the inside 5 of the door, which is for example gray, and the section of the window 7, which is light.

Figure 3C:
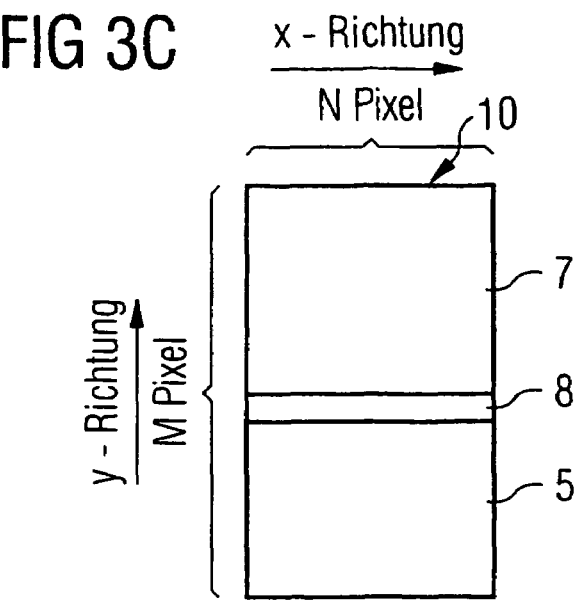
FIG. 3c shows an edge box which covers an edge area of the window and of the inside of the door.
Figure 3D:
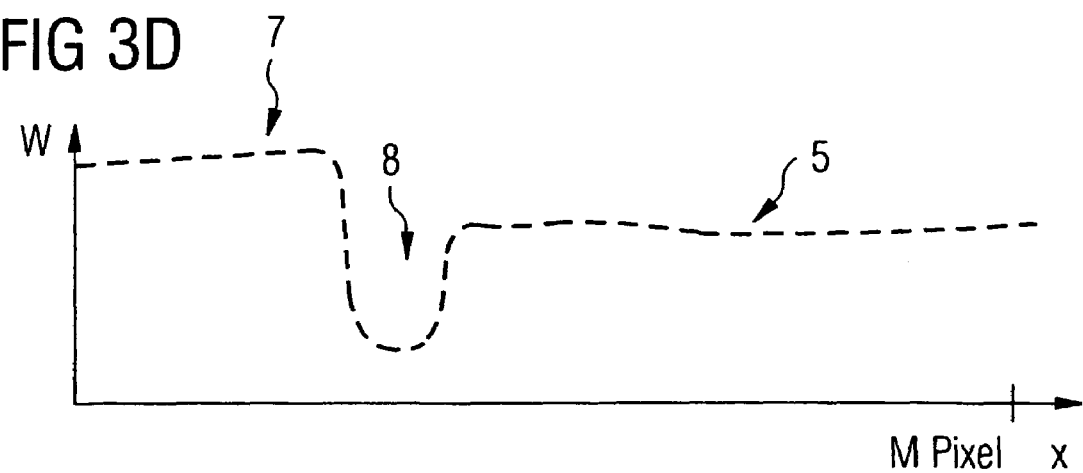
FIG. 3d shows a curve of gray-scale values plotted over the edge box from the window area to the area of the inside of the door.

Thus, for the three areas inside the edge box 10 which are scanned pixel-by-pixel by the camera 2, a representation is produced of the gray-scale values which are shown as a function in the working direction (y-direction in FIG. 3c) in FIG. 3d over the pixels M. Here, the course of the gray-scale values of the window 7 (transparent), door seal 8 (black) and inside 5 of the door (gray) can be detected.

Figure 3E:
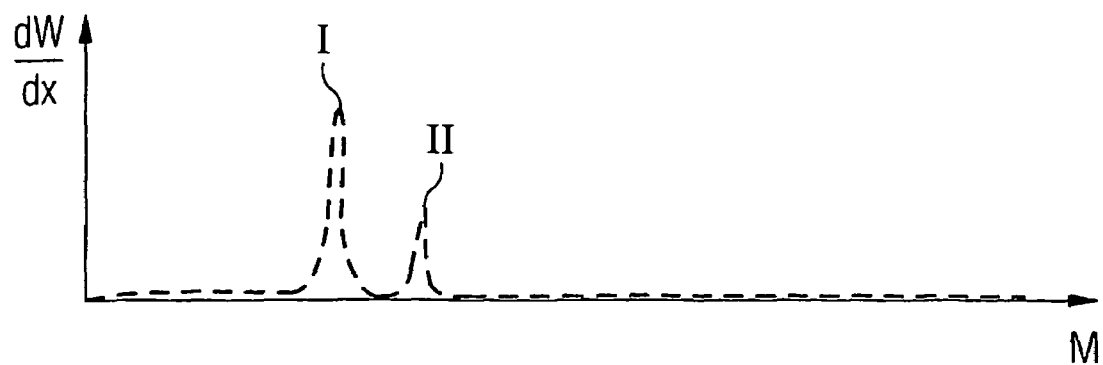
FIG. 3e shows the first derivation of the curve of gray-scale values according to location.

FIG. 3e shows the derivative function of the gray-scale value function from FIG. 3d according to location, i.e. according to working direction (y-direction in FIG. 3c, x-direction in FIG. 3d). This course is obtained in practice with the aid of a cut-off filter. The positions of the edges between the window 7 and the door seal 8 on the one hand (position I) and between the door seal 8 and the inside 5 of the door (position II) on the other are expressed here. The locations of the edges (positions I and II) are typical for this door position, which is thus uniquely characterized.

With this method of representation, very little storage space is required since for each of the edge boxes 10 to 16 only the position of two diagonally opposite corners, the working direction of the camera 2 and a threshold value for the gray-scale values have to be adjusted. A different threshold value can be individually selected for each edge box 10 to 16.

By comparing the positions of the edge boxes 10 to 16 with the door 4 closed (FIG. 3a) and with the door 4 open (FIG. 3b), the change of perspective produces a shift of the edge boxes 10 to 16 relative to the door 4. The edges of the edge boxes 10 to 16 change even when there are very slight changes in the opening angle of the door 4. Consequently, the angle at which the door 4 is open can also be ascertained. Since the concealment of individual edge boxes 10 to 16 by occupants of the vehicle is in principle possible, a certain minimum number of edge boxes 10 to 16 is preferably specified, in order that, even if some of them are concealed, reliable measurement results can be obtained from the other unconcealed edge boxes, in which the edge positions match the stored edge positions.

Figure 4A:
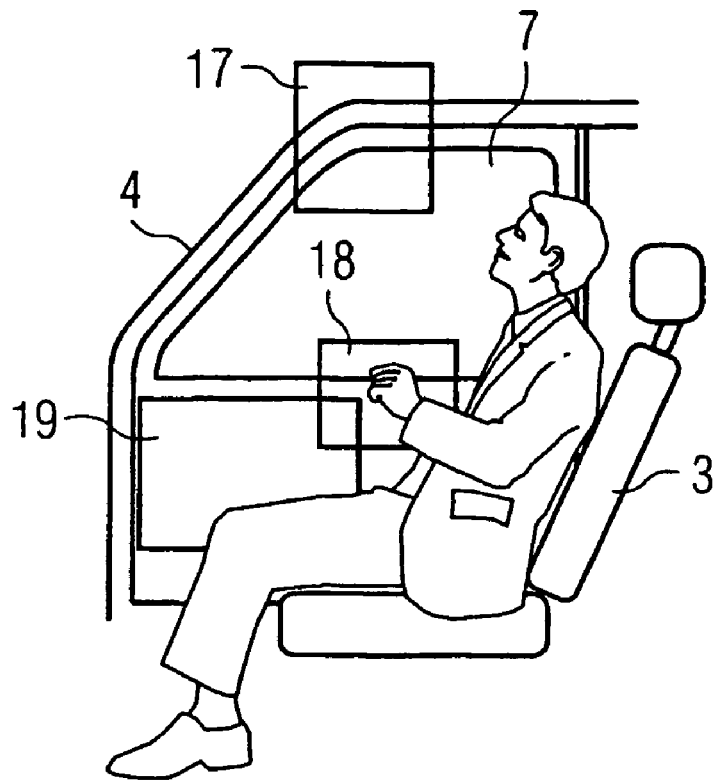
FIGS. 4a, b show a lateral plan view of a vehicle passenger and the passenger door with measuring panels for a 3D camera and/or a sketch with projections of measuring points.
Figure 4B:
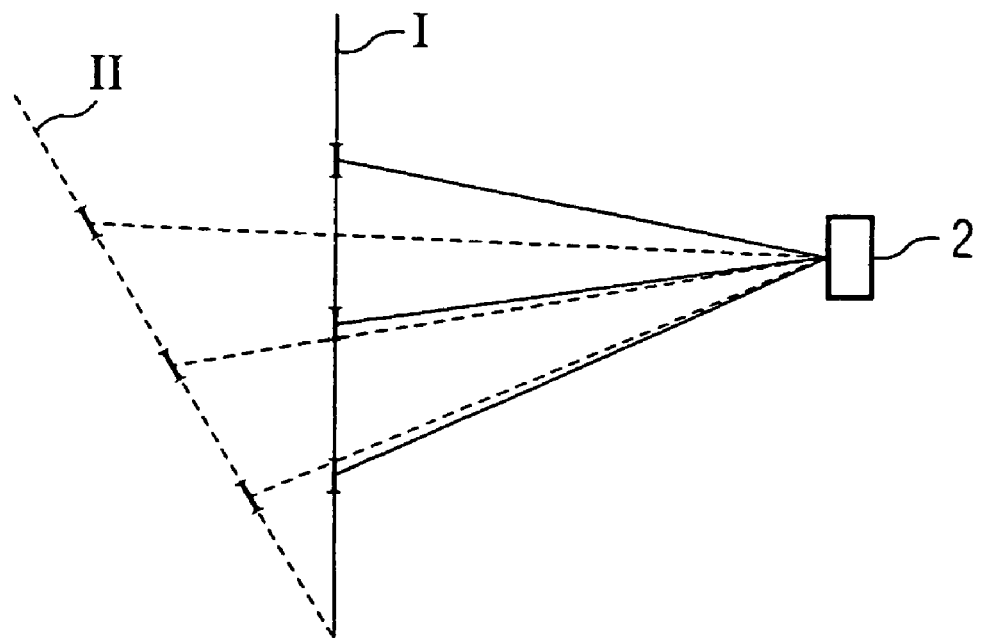

In another embodiment, the camera 2 is fashioned as a 3D camera. In this case, measuring panels 17 to 19 (FIG. 4a) are defined which map parts of the door 4 and inside which the mean distance to the camera 2 is measured. By comparing the actual distance relative to a stored distance which was measured for example for the closed door 4, it can be concluded whether the door 4 is open or closed. The measuring panels 17 to 19 are projected onto a projection plane, e.g. the vehicle floor (birdview). From the relative change in the mean distances of the measuring panels 17 to 19 from one another when the door is closed (FIG. 4b) (position I) and when the door 4 is open (position II), the opening angle of the door 4 is determined.

Figure 5A:
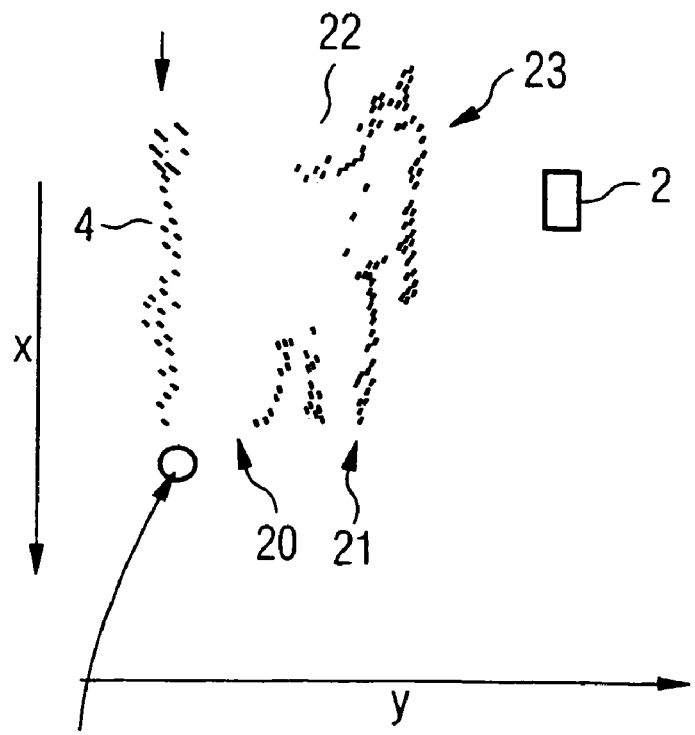
FIGS. 5a, b show image dots obtained with the 3D camera after transformation onto a plane coplanar with the vehicle floor.

In a further method (FIGS. 5a, b), the measuring points are projected onto a plane coplanar with the vehicle floor. This produces along a y-axis (axis at right angles to the direction of travel of the vehicle) a characteristic grouping of points whose position along the longitudinal axis of the respective point cloud reproduces the positions of objects. Thus, one grouping of points reproduces the position of the door 4 in a closed state (FIG. 5a), while positions 20, 21 represent the legs of a passenger and position 22 the body and the backrest of the seat 3.

Figure 5B:
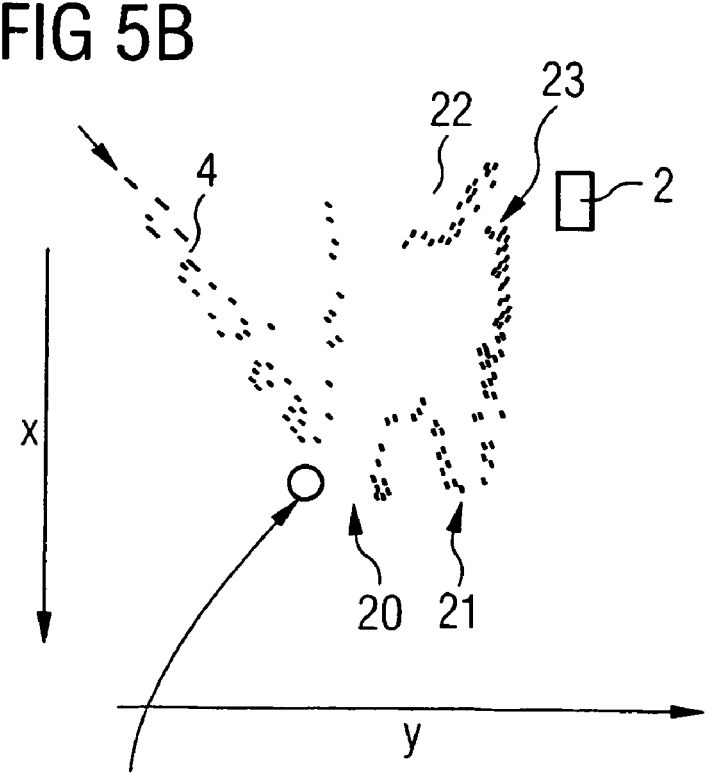

In an open state (FIG. 5b), the point cloud which represents the door 4 has changed its position, while all other point clouds 20 to 22 essentially have the same position. The direction of movement of the point cloud for the door 4 is then searched for, either by means of a door model including the known position of the pivot of the door 4 or without a model by drawing on transformations known from the literature, e.g. the Hough transformation (cf. K. R. Castleman, Prentice Hall; P. Haberäcker, Carl Hausen Verlag publishers, Munich, Vienna; B. Jähne, H. Haußecker, Computer Vision and Applications, Academic Press.

The invention claimed is:
1. A method for detecting a position of an object in a vehicle and/or an object forming a part of the vehicle, comprising:
 recording a sequence of images of a door of a vehicle with a camera;

generating a differential image by comparing a currently recorded image of the door with a previously stored image of the door;

determining whether the door is in an open state or a closed state by evaluating the differential image; and if the door is in the open state, switching off a security device protecting at least one occupant of the vehicle.

2. The method according to claim 1, which further comprises determining an opening angle of the door by evaluating the differential image.

3. The method according to claim 1, which further comprises:

determining whether a window located in the door is open by evaluating the differential image; and if an object is within an open area of a frame of the door, generating a signal indicating the presence of the object within the open area;

the open area of the frame of the door being formed when the window is open.

4. The method according to claim 3, which further comprises preventing the window from being closed if the signal indicates the presence of the object within the open area.

5. The method according to claim 1, which further comprises using gray-scale images when performing the step of determining whether the door is in the open state or the closed state.

6. The method according to claim 4, which further comprises defining virtual image areas to obtain the gray-scale images such that changes in a plurality of gray-scale values occur if there is a change in the open state of the door.

7. The method according to claim 6, which further comprises, for each of the gray-scale images, defining a curve of gray-scale values as a function of a location, obtaining a differentiated curve by differentiating the curve of gray-scale values with respect to the location, storing the differentiated curve, and using the differentiated curve when performing the step of determining whether the door is in the open state or the closed state.

8. The method according to claim 1, which further comprises:

obtaining three-dimensional distance images with the camera; and using the three-dimensional distance images when performing the step of determining whether the door is in the open state or the closed state.

9. The method according to claim 8, which further comprises:

after transforming distance points into a vehicle system, projecting all of the distance points onto a vehicle floor or onto a plane parallel to the vehicle floor;

storing the projected images; and using the stored projected images in a comparison when performing the step of determining whether the door is in the open state or the closed state.

10. The method according to claim 8, which further comprises defining point clouds of the door.

11. The method according to claim 8, wherein the security device is an airbag system.

12. A method for detecting a position of an object in a vehicle and/or an object forming a part of the vehicle, comprising:

recording a sequence of images of at least a portion of a door of a vehicle with a camera;

generating a differential image by comparing a currently recorded image of at least the portion of the door with a previously stored image of at least the portion of the door;

determining whether a window located in the door is in an open state by evaluating the differential image; and if an object is within an open area of a frame of the door, generating a signal indicating the presence of the object within the open area; the open area of the frame of the door being formed when the window is open.

13. The method according to claim 12, which further comprises preventing the window from being closed if the signal indicates the presence of the object within the open area.

14. The method according to claim 12, which further comprises using gray-scale images when performing the step of determining whether the window is in the open state.

15. The method according to claim 14, which further comprises defining virtual image areas to obtain the gray-scale images such that changes in a plurality of gray-scale values occur if there is a change in the open state of the door.

16. The method according to claim 15, which further comprises, for each of the gray-scale images, defining a curve of gray-scale values as a function of a location, obtaining a differentiated curve by differentiating the curve of gray-scale values with respect to the location, storing the differentiated curve, and using the differentiated curve when performing the step of determining whether the window is in the open state.

17. The method according to claim 12, which further comprises:

obtaining three-dimensional distance images with the camera; and using the three-dimensional distance images when performing the step of determining whether the window is in the open state.

18. The method according to claim 17, which further comprises:

after transforming distance points into a vehicle system, projecting all of the distance points onto a vehicle floor or onto a plane parallel to the vehicle floor;

storing the projected images; and using the stored projected images in a comparison when performing the step of determining whether the window is in the open state.

19. The method according to claim 18, which further comprises defining point clouds of the door.

20. A device for detecting a position of an object in a vehicle and/or an object forming a part of the vehicle, the device comprising:

a camera recording a sequence of images of a door of a vehicle; and a monitoring device configured to:

generate a differential image by comparing a currently recorded image of the door with a previously stored image of the door;

determine whether the door is in an open state or a closed state by evaluating the differential image; and switch off a security device protecting at least one occupant of the vehicle if the door is in the open state.

21. The device according to claim 20, in combination with the security device, wherein the security device is an airbag system.

22. A device for detecting a position of an object in a vehicle and/or an object forming a part of the vehicle, the device comprising:

a camera recording a sequence of images of at least a portion of a door of a vehicle; and a monitoring device configured to:

generate a differential image by comparing a currently recorded image of at least the portion of the door with a previously stored image of at least the portion of the door;

determine whether a window located in the door is in an open state by evaluating the differential image; and
generate a signal indicating whether an object is within an open area of a frame of the door; the open area of the frame of the door being formed when the window is open.

23. The device according to claim 22, wherein the signal generated by said monitoring device prevents the window from being closed if the signal indicates that the object is within the open area.

* * * * *